United States Patent
Liu

(10) Patent No.: US 10,575,175 B2
(45) Date of Patent: Feb. 25, 2020

(54) ACCESS CONTROL METHOD AND ACCESS CONTROL APPARATUS

(71) Applicant: BEIJING ZHIGU RUI TUO TECH CO., LTD., Beijing (CN)

(72) Inventor: Jia Liu, Beijing (CN)

(73) Assignee: Beijing Zhigu Rui Tuo Tech Co., Ltd., Bejing (CN)

( * ) Notice: Subject to any disclaimer, the term of this patent is extended or adjusted under 35 U.S.C. 154(b) by 278 days.

(21) Appl. No.: 15/543,835

(22) PCT Filed: Jan. 7, 2016

(86) PCT No.: PCT/CN2016/070350
§ 371 (c)(1),
(2) Date: Jul. 14, 2017

(87) PCT Pub. No.: WO2016/112820
PCT Pub. Date: Jul. 21, 2016

(65) Prior Publication Data
US 2018/0014188 A1 Jan. 11, 2018

(30) Foreign Application Priority Data
Jan. 16, 2015 (CN) .......................... 2015 1 0024233

(51) Int. Cl.
*H04L 12/06* (2006.01)
*H04W 12/06* (2009.01)
(Continued)

(52) U.S. Cl.
CPC ........... *H04W 12/06* (2013.01); *H04W 12/08* (2013.01); *H04L 63/0876* (2013.01)

(58) Field of Classification Search
None
See application file for complete search history.

(56) References Cited

U.S. PATENT DOCUMENTS 8,813,194 B2     8/2014  Sposato et al.
2006/0229061 A1* 10/2006 Chaplin ................. H04L 63/08
                                                          455/411
(Continued)

FOREIGN PATENT DOCUMENTS

CN   102625310 A   8/2012
CN   102802156 A   11/2012
(Continued)

OTHER PUBLICATIONS

International Search Report and Written Opinion for Application No. PCT/CN2016/070350, dated Apr. 1, 2016, 9 pages.

*Primary Examiner* — Kaveh Abrishamkar
(74) *Attorney, Agent, or Firm* — Sheppard Mullin Richter & Hampton LLP

(57) ABSTRACT

Embodiments of the present application disclose access control method and an access control apparatus. A method disclosed herein comprises: sending information associated with authentication of at least one access point device; and controlling at least one second device to access a target access point device through at least one first device; wherein the at least one first device is a device that receives the information associated with authentication of at least one access point device. The methods and apparatus of the embodiments of the present application, by using an authentication manner through cooperation between devices, enable a device currently used by a user to rapidly and efficiently access a target access point device, so as to more efficiently obtain access to a wireless local area network.

20 Claims, 14 Drawing Sheets

(51) Int. Cl.
*H04W 12/08* (2009.01)
*H04L 29/06* (2006.01)

(56) References Cited

U.S. PATENT DOCUMENTS

| | | | |
|---|---|---|---|
| 2007/0081477 A1* | 4/2007 | Jakkahalli | H04L 12/4645 |
| | | | 370/310 |
| 2008/0076425 A1* | 3/2008 | Khetawat | H04W 88/12 |
| | | | 455/436 |
| 2008/0267407 A1* | 10/2008 | Vanderveen | H04L 9/083 |
| | | | 380/277 |
| 2012/0311328 A1* | 12/2012 | Wang | H04W 12/06 |
| | | | 713/168 |
| 2013/0042031 A1* | 2/2013 | Jeon | H04W 48/16 |
| | | | 710/36 |
| 2013/0247164 A1* | 9/2013 | Hoggan | H04W 12/06 |
| | | | 726/8 |
| 2013/0343304 A1 | 12/2013 | Kaippallimalil et al. | |
| 2014/0258723 A1 | 9/2014 | Zhang | |
| 2014/0287751 A1 | 9/2014 | Lee et al. | |
| 2016/0302063 A1* | 10/2016 | Ahmed | H04W 12/06 |
| 2016/0337942 A1* | 11/2016 | Catovic | H04W 48/08 |
| 2016/0352729 A1* | 12/2016 | Malik | H04W 12/06 |
| 2017/0181088 A1* | 6/2017 | Kim | H04W 52/0229 |

FOREIGN PATENT DOCUMENTS

| | | |
|---|---|---|
| CN | 103139768 A | 6/2013 |
| CN | 104144463 A | 11/2014 |
| CN | 104540133 A | 4/2015 |
| WO | 2010/075546 A2 | 7/2010 |
| WO | 2014/163877 A1 | 10/2014 |

* cited by examiner

ACCESS CONTROL METHOD AND ACCESS CONTROL APPARATUS

CROSS-REFERENCE TO RELATED APPLICATIONS

The present application is a National Phase Application of International Application No. PCT/CN2016/070350, filed on Jan. 7, 2016, which claims priority to and benefit of Chinese Patent Application No. 201510024233.X, filed with the Chinese Patent Office on Jan. 16, 2015 and entitled "ACCESS CONTROL METHOD AND ACCESS CONTROL APPARATUS". Both of the above-referenced applications are incorporated into the present application by reference in their entirety.

TECHNICAL FIELD

Embodiments of the present application generally relate to the field of communication technologies, and in particular, to access control methods and access control apparatus.

BACKGROUND

With the progress of science and technology, the number of types of mobile devices has increased. More and more users not only carry smartphones, tablets and other devices, but also wear smart wristbands, smart watches, smart glasses and other wearable devices. Some (such as the smartphones) of such devices can access the Internet anytime and anywhere through a cellular communication module, but most of the time, as a wireless local area network (WLAN) has advantages of a low cost (free in many places), a high speed and low energy consumption, access to the Internet through Wi-Fi or Bluetooth becomes a better choice for many devices. In fact, some telecom operators also deploy a large number of WLAN access points (APs) in hotspot regions of a city, so as to improve the network bandwidth available to users or offload a cellular network. Generally, in a process where the user searches for an AP in order to access a WLAN through the AP, authentication is required and related operations may be very inconvenient.

SUMMARY

In view of this, one objective of the embodiments of the present application is to provide an access control mechanism with higher efficiency.

To achieve the foregoing objective, in a first aspect of the embodiments of the present application, an access control method is provided, the method comprising:
sending information associated with authentication of at least one access point device; and
controlling at least one second device to access a target access point device through at least one first device;
wherein the at least one first device is a device/devices that receives/receive the information associated with authentication of at least one access point device.

In a second aspect of the embodiments of the present application, an access method is provided, the method comprising:
sending information associated with authentication of at least one access point device; and
accessing a target access point device through at least one first device;
wherein the at least one first device is a device/devices that receives/receive the information associated with authentication of at least one access point device.

In a third aspect of the embodiments of the present application, an access control method is provided, the method comprising:
acquiring information associated with authentication of at least one access point device;
controlling at least one first device to access a target access point device at least according to the information associated with authentication of at least one access point device; and
sending information associated with that the at least one first device has accessed the target access point device.

In a fourth aspect of the embodiments of the present application, an access control method is provided, the method comprising:
acquiring information associated with authentication of at least one access point device;
accessing a target access point device at least according to the information associated with authentication of at least one access point device; and
sending information associated with access to the target access point device.

In a fifth aspect of the embodiments of the present application, an access control apparatus is provided, the apparatus comprising:
a first sending module, configured to send information associated with authentication of at least one access point device; and
a first control module, configured to control at least one second device to access a target access point device through at least one first device;
wherein the at least one first device is a device/devices that receives/receive the information associated with authentication of at least one access point device.

In a sixth aspect of the embodiments of the present application, an access apparatus is provided, the apparatus comprising:
a fourth sending module, configured to send information associated with authentication of at least one access point device; and
a first access module, configured to access a target access point device through at least one first device;
wherein the at least one first device is a device/devices that receives/receive the information associated with authentication of at least one access point device.

In a seventh aspect of the embodiments of the present application, an access control apparatus is provided, the apparatus comprising:
a fifth acquisition module, configured to acquire information associated with authentication of at least one access point device;
a second control module, configured to control at least one first device to access a target access point device at least according to the information associated with authentication of at least one access point device; and
a seventh sending module, configured to send information associated with that the at least one first device has accessed the target access point device.

In an eighth aspect of the embodiments of the present application, an access control apparatus is provided, the apparatus comprising:
a sixth acquisition module, configured to acquire information associated with authentication of at least one access point device;

a second access module, configured to access a target access point device at least according to the information associated with authentication of at least one access point device; and an eighth sending module, configured to send information associated with access to the target access point device.

In an ninth aspect of the embodiments of the present application, a computer readable storage device is provided, comprising at least one executable instruction, which, in response to execution, causes a system comprising a processor to perform operations, comprising:

sending information associated with authentication of at least one access point device; and controlling at least one second device to access a target access point device through at least one first device;

wherein the at least one first device is a device that receives the information associated with authentication of at least one access point device.

In an tenth aspect of the embodiments of the present application, a device for access control is provided, comprising a processor and memory, wherein the memory storing computer executable instructions, the processor being connected with the memory via a communication bus, and when the device is operating, the processor executes or facilitates execution of the executable instructions stored by the memory:

sending information associated with authentication of at least one access point device; and controlling at least one second device to access a target access point device through at least one first device;

wherein the at least one first device is a device that receives the information associated with authentication of at least one access point device.

In an eleventh aspect of the embodiments of the present application, a computer readable storage device is provided, comprising at least one set of executable instructions, which, in response to execution, cause a system comprising a processor to perform operations, comprising:

sending information associated with authentication of at least one access point device; and accessing a target access point device through at least one first device;

wherein the at least one first device is a device that receives the information associated with authentication of at least one access point device.

In an twelfth aspect of the embodiments of the present application, a device for access is provided, comprising a processor and memory, wherein the memory storing computer executable instructions, the processor being connected with the memory via a communication bus, and when the device is operating, the processor executes or facilitates execution of the executable instructions stored by the memory:

sending information associated with authentication of at least one access point device; and accessing a target access point device through at least one first device;

wherein the at least one first device is a device that receives the information associated with authentication of at least one access point device.

In an thirteenth aspect of the embodiments of the present application, a computer readable storage device is provided, comprising at least one set of executable instructions, which, in response to execution, cause a system comprising a processor to perform operations, comprising:

acquiring information associated with authentication of at least one access point device;

controlling at least one first device to access a target access point device at least according to the information associated with authentication of at least one access point device; and sending information associated with that the at least one first device has accessed the target access point device.

In an fourteenth aspect of the embodiments of the present application, a device for access control is provided, comprising a processor and memory, wherein the memory storing computer executable instructions, the processor being connected with the memory via a communication bus, and when the device is operating, the processor executes or facilitates execution of the executable instructions stored by the memory:

acquiring information associated with authentication of at least one access point device;

controlling at least one first device to access a target access point device at least according to the information associated with authentication of at least one access point device; and sending information associated with that the at least one first device has accessed the target access point device.

In an fifteenth aspect of the embodiments of the present application, a computer readable storage device is provided, comprising at least one set of executable instructions, which, in response to execution, cause a system comprising a processor to perform operations, comprising:

acquiring information associated with authentication of at least one access point device;

accessing a target access point device at least according to the information associated with authentication of at least one access point device; and sending information associated with access to the target access point device.

In an sixteenth aspect of the embodiments of the present application, a device for access control is provided, comprising a processor and memory, wherein the memory storing computer executable instructions, the processor being connected with the memory via a communication bus, and when the device is operating, the processor executes or facilitates execution of the executable instructions stored by the memory:

acquiring information associated with authentication of at least one access point device;

accessing a target access point device at least according to the information associated with authentication of at least one access point device; and sending information associated with access to the target access point device The methods and the apparatuses of the embodiments of the present application, by using an authentication manner through cooperation between devices, enable a device currently used by a user to rapidly and efficiently access a target access point device, so as to more efficiently obtain access to a WLAN.

DETAILED DESCRIPTION

Specific implementations of the present application are described in detail hereinafter with reference to the accompanying drawings and embodiments. The following embodiments are intended to describe the present application, but not to limit the scope of the present application.

It should be understood by those skilled in the art that the terms such as "first" and "second" in the present application are merely intended to distinguish different devices, modules or parameters, etc., which neither represent any particular technical meaning nor indicate a necessary logical sequence between them.

Generally, when a user expects to access a WLAN through an AP device, the user needs to pass authentication of the AP device, and such authentication may require participation of other devices. For example, in an authentication manner of a short message verification code, it is required that the user should input a mobile phone number on a currently used device and use a short message verification code received by the mobile phone corresponding to the mobile phone number to perform verification, if the device currently used by the user is not that mobile phone (for example, a tablet PC), it is necessary to acquire the verification code by viewing a short message of the mobile phone and perform input and authentication on the currently used device, such operations may be very inconvenient and the efficiency is low. The embodiments of the present application make full use of the characteristic that authentication of the AP device needs to be completed through participation of multiple devices, and provide an access control scheme with higher efficiency.

In the embodiments of the present application, the first device and the second device may comprise any terminal device with a wireless Internet access function, for example, a mobile phone, a tablet PC, a PC, a smart bracelet, an on-board smart device or the like, and the first device and the second device may be the same device. In the embodiments of the present application, the first and the second are used to distinguish the roles that the devices play in the process of accessing a WLAN. The second device is a device that a user uses to initiate an AP search in the beginning and which is expected to access the WLAN; the first device is a device that participates in authentication of an AP device on the second device, the embodiments of the present application use at least one of such devices to assist the second device in accessing the WLAN, such first devices are generally trusted devices of the user, for example, other devices except those owned or carried by the user, or devices of other users such as the user's relatives and friends, or public devices in particular areas which allow the user to use.

Figure 1:
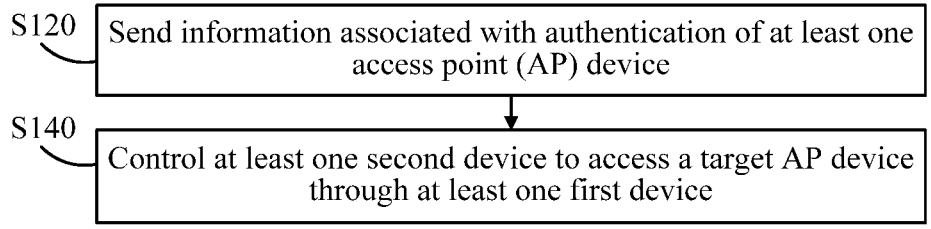
FIG. 1 is a flowchart of an example of an access control method according to a first embodiment of the present application.

FIG. 1 is a flowchart of an example of an access control method according to a first embodiment of the present application. The method may be executed by a control apparatus that belongs to any second device, or executed by another control apparatus independent of any second device and configured to control at least one second device to access a WLAN. As shown in FIG. 1, the method comprises:

S120. Send information associated with authentication of at least one AP device.

When the second device searches related information (for example, Service Set Identifier (SSID)) of at least one AP device broadcast by the at least one AP device, the second device selects an expected AP device and accepts authentication of the AP device. The authentication manner is a manner that requires participation of at least one first device, for example, authentication is performed in a manner of sending a short message authentication code to the at least one first device. In order to more efficiently access a network, this method sends information associated with authentication of at least one AP device is sent to the at least one first device. For each second device, the information associated with authentication of at least one AP device refers to such information: the at least one first device can provide an authentication message for authentication to the corresponding AP device at least according to the information. For example, in the authentication manner of a short message authentication code, the second device provides identification information of the at least one first device to the at least one AP device, the at least one first device will receive a short message authentication code, and an authentication page or authentication link configured to input a short message authentication code and submit the short message authentication code to the corresponding AP device can be sent to the at least one first device in the method of this embodiment, that is, the information associated with authentication of at least one AP device at least comprises the authentication page or the authentication link.

S140. Control at least one second device to access a target AP device through at least one first device.

After the information associated with authentication of at least one AP device is sent to at least one first device, the at least one first device can automatically perform corresponding authentication, so as to enable the apparatus executing the method of this embodiment to control at least one second device to access a target AP device through the corresponding first device.

To sum up, the method of this embodiment, by using an authentication manner through cooperation between devices, enables a device currently used by a user to rapidly and efficiently access a target AP device, so as to more efficiently obtain access to a WLAN.

In one possible implementation, if the apparatus executing the method of this embodiment has established a connection with the at least one first device, for example, the connection is established through Bluetooth, Infrared, Zigbee, Near Field Communication (NFC) or other manners, step S120 may further comprise:

S122. Send the information associated with authentication of at least one AP device to the at least one first device.

According to the manner of establishing a connection with the at least one first device, in step S122, the information associated with authentication of at least one AP device can be sent through at least one manner of Bluetooth, Infrared, Zigbee and NFC.

In another possible implementation, the apparatus executing the method of this embodiment can send the information associated with authentication of at least one AP device through broadcasting regardless of whether the apparatus executing the method of this embodiment has established a connection with the at least one first device or not. In such an implementation, step S120 may further comprise:

S124. Send the information associated with authentication of at least one AP device through broadcasting.

In such an implementation, the broadcast information associated with authentication of at least one AP device may comprise identification information of a target first device, to enable the first device that receives the broadcast message to assist in authentication according to its own identifier comprised in the information.

In addition, the method of this embodiment, before step S120, further comprises:

S112. Send an access request of the at least one second device to the at least one AP device.

S114. Acquire the information associated with authentication of at least one AP device.

After receiving the request sent in step S112, the at least one AP device will send related information to the second device, to prompt the at least one second device to perform authentication. For example, in the authentication manner of a short message authentication code, the AP device may send a page to the second device where identification information of the device that receives a short message authentication code is input. There may be a link with which to input the short message authentication code and to send the short message authentication code to the corresponding AP device on the page. The information associated with authentication of at least one AP device sent to at least one first device in step S120 may be the information acquired in step S114, or a part thereof.

S116. Send identification information of the at least one first device to the at least one AP device. It is feasible to send identification information of the at least one first device to the at least one AP device through the information obtained in step S114, to enable the at least one first device to receive an authentication message for passing authentication of the at least one AP device. For example, identification information of the at least one first device is input in a suitable position on the page received in step S114.

In addition, in a method of this embodiment, the accessing a target AP device through at least one first device in step S140 alternatively comprises: after the at least one first device has accessed the target AP device, indirectly accessing the target AP device by taking the first device as a wireless hotspot. Correspondingly, the method of this embodiment may further comprise:

S130. Acquire information associated with that at least one of the at least one first device has accessed the target AP device. The information is configured to inform the apparatus executing the method of this embodiment that at least one of the at least one first device has accessed the target AP device. Alternatively, the information is a notification message from at least one of the at least one first device or a control apparatus of at least one of the at least one first device.

In an implementation where the second device controlled by the apparatus executing the method of this embodiment has not established a connection with any first device accessed the target AP device, step S140 may further comprise:

S142. Control the at least one second device to respectively establish a connection with one of the first devices that have accessed the target AP device.

In one possible implementation, in order to obtain the access of the second device to the target AP device, for each second device, the connection is established in a manner of taking one of the first devices that has accessed the target AP device as a wireless hotspot. Alternatively, the connection can be established through at least one manner of Bluetooth, Infrared, Zigbee and NFC.

According to different roles that the apparatus executing the method of this embodiment plays, step S140 may further comprise:

S144. Generate a control command that controls the at least one second device to access the target AP device through the at least one first device.

S146. Send the control command. Alternatively, the control command is sent in such a manner that the at least one second device can receive, for example, the control command is directly sent to the at least one second device or sent to a control apparatus of the at least one second device.

It should be noted that, the target AP device may be one of the at least one AP device, but the possibility is not ruled out that the target AP device is an AP device other than the at least one AP device. Moreover, in the method of this embodiment, actions where the at least one first device is involved, such as receiving and sending of the at least one first device may be automatically performed, so as to complete access of the second device to the WLAN without assistance of manual intervention.

Figure 2:
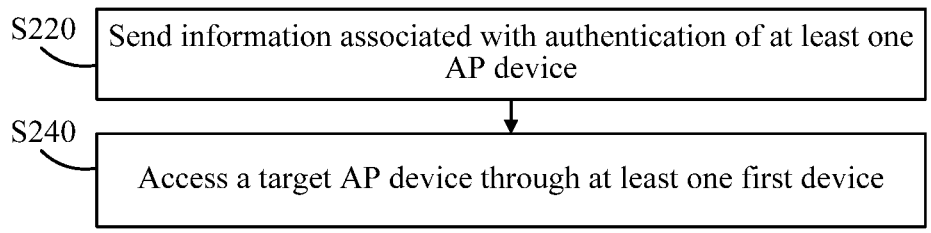
FIG. 2 is a flowchart of an example of an access method according to an embodiment of the present application.

FIG. 2 is a flowchart of an example of an access method according to an embodiment of the present application. The method may be executed by any second device. As shown in FIG. 2, the method comprises:

S220. Send information associated with authentication of at least one AP device.

When the second device searches related information of at least one AP device broadcast by the at least one AP device, the second device selects an expected AP device and accepts authentication of the AP device. The authentication manner is a manner that requires participation of at least one first device, for example, authentication is performed in a manner of sending a short message authentication code to the at least one first device. In order to more efficiently access a network, in the method of this embodiment, the second device sends information associated with authentication of at least one AP device to the at least one first device. For each second device, the information associated with authentication of at least one AP device refers to such information: the at least one first device can provide an authentication message for authentication to the corresponding AP device at least according to the information. For example, in the authentication manner of a short message authentication code, the second device provides identification information of the at least one first device to the at least one AP device, the at least one first device will receive a short message authentication code, the second device executing this method may send an authentication page or authentication link configured to input a short message authentication code and submit the short message authentication code to the corresponding AP device, to the at least one first device, that is, the information associated with authentication of at least one AP device comprises at least the authentication page or the authentication link.

S240. Access a target AP device through at least one first device.

After the information associated with authentication of at least one AP device is sent to at least one first device, the at least one first device can automatically perform corresponding authentication, so as to enable the second device executing the method of this embodiment to access a target AP device through the corresponding first device.

To sum up, the method of this embodiment, by using an authentication manner through cooperation between devices, enables a device currently used by a user to rapidly and efficiently access a target AP device with the help of the device assisting with authentication, so as to more efficiently obtain access to a WLAN.

In one possible implementation, if the second device executing the method of this embodiment has established a connection with the at least one first device, for example, the connection is established through Bluetooth, Infrared, Zigbee, NFC or other manners, step S220 may further comprise:

S222. Send the information associated with authentication of at least one AP device to the at least one first device.

According to the manner in which the second device executing the method of this embodiment establishes a connection with the at least one first device, in step S222, the information associated with authentication of at least one AP device can be sent through at least one manner of Bluetooth, Infrared, Zigbee and NFC.

In another possible implementation, the second device executing the method of this embodiment can send the information associated with authentication of at least one AP device through broadcasting regardless of whether the apparatus executing the method of this embodiment has established a connection with the at least one first device or not. In such an implementation, step S220 may further comprise:

S224. Send the information associated with authentication of at least one AP device through broadcasting.

In such an implementation, the broadcast information associated with authentication of at least one AP device may comprise identification information of a target first device, to enable the first device that receives the broadcast message to assist in authentication according to its own identifier comprised in the information.

In addition, the method of this embodiment, before step S220, further comprises:

S212. Send an access request of the at least one second device to the at least one AP device.

S214. Acquire the information associated with authentication of at least one AP device.

After receiving the request sent by the second device in step S212, the at least one AP device will send related information to the second device, to prompt the at least one second device to perform authentication. For example, in the authentication manner of a short message authentication code, the AP device may send a page to the second device where identification information of the device that receives a short message authentication code is input. There may be a link with which to input the short message authentication code and to send the short message authentication code to the corresponding AP device on the page. The information associated with authentication of at least one AP device sent to at least one first device in step S220 may be the information acquired in step S214, or a part thereof.

S216. Send identification information of the at least one first device to the at least one AP device. It is feasible to send identification information of the at least one first device to the at least one AP device through the information obtained in step S214, to enable the at least one first device to receive an authentication message for passing authentication of the at least one AP device. For example, identification information of the at least one first device is input in a suitable position on the page received in step S214.

In addition, in the method of this embodiment, the accessing a target AP device through at least one first device in step S240 alternatively comprises: after the at least one first device has accessed the target AP device, indirectly accessing the target AP device by taking the first device as a wireless hotspot. Correspondingly, the method of this embodiment may further comprise:

S230. Acquire information associated with that at least one of the at least one first device has accessed the target AP device. The information is configured to inform the second device executing the method of this embodiment that at least one of the at least one first device has accessed the target AP device. Alternatively, the information is a notification message from at least one of the at least one first device or a control apparatus of at least one of the at least one first device.

In an implementation where the second device executing the method of this embodiment has not established a connection with any first device accessed the target AP device, step S240 may further comprise:

S242. Establish a connection with one of the first devices that have accessed the target AP device.

In one possible implementation, in order to obtain the access of the second device to the target AP device, the connection is established in a manner of taking one of the first devices that have accessed the target AP device as a wireless hotspot. Alternatively, the connection can be established through at least one manner of Bluetooth, Infrared, Zigbee and NFC.

It should be noted that, the target AP device may be one of the at least one AP device, but the possibility is not ruled out that the target AP device is an AP device other than the at least one AP device. Moreover, in the method of this embodiment, actions where the at least one first device is involved, such as receiving and sending of the at least one first device, may be automatically performed, so as to complete access of the second device to the WLAN without assistance of manual intervention.

Figure 3:
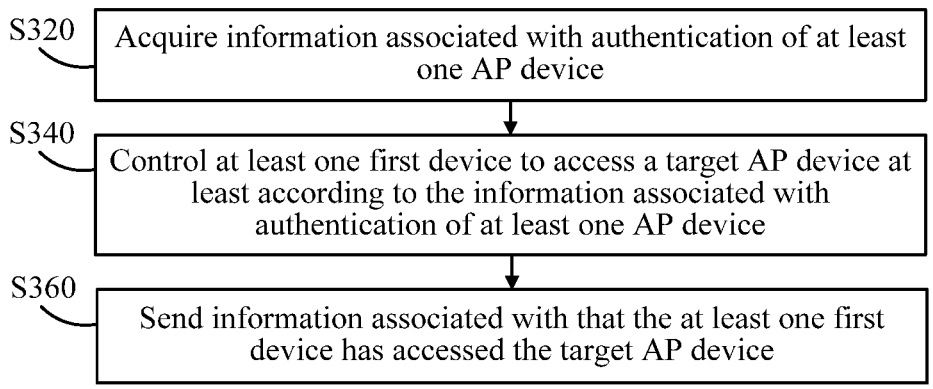
FIG. 3 is a flowchart of an example of an access control method according to a second embodiment of the present application.

As shown in FIG. 3, FIG. 3 is a flowchart of an example of an access control method according to a second embodiment of the present application. The method may be executed by a control apparatus that belongs to any first device, or executed by another control apparatus independent of any first device and configured to control at least one first device. As shown in FIG. 3, the method comprises:

S320. Acquire information associated with authentication of at least one AP device.

As described above in combination with the embodiments shown in FIG. 1 and FIG. 2, when a user uses a second device to access a WLAN, in order to more efficiently access a network, information associated with authentication of at least one AP device is sent to the at least one first device, and such information is acquired in step S320 in the method of this embodiment. The information associated with authentication of at least one AP device refers to such information: the at least one first device can provide an authentication message for authentication to the corresponding AP device at least according to the information.

S340. Control at least one first device to access a target AP device at least according to the information associated with authentication of at least one AP device.

After the information associated with authentication of at least one AP device is acquired, the apparatus executing the method of this embodiment can control the at least one first device to automatically perform corresponding authentication, so as to control the at least one first device to access a target AP device.

S360. Send information associated with that the at least one first device has accessed the target AP device.

After the at least one first device has successfully accessed the target AP device, a message associated with that the at least one first device has accessed the target AP device can be sent in such a manner that at least one second device can receive. The message is configured to inform the at least one second device that at least one of the at least one first device has accessed the target AP device. Alternatively, the message is sent to at least one of the at least one second device or a control apparatus of at least one of the at least one second device.

To sum up, the method of this embodiment, by using an authentication manner through cooperation between devices, enables a device currently used by a user to rapidly and efficiently access a target AP device, so as to more efficiently obtain access to a WLAN.

In one possible implementation, if the body executing the method of this embodiment has established a connection with the at least one second device, for example, the connection is established through Bluetooth, Infrared, Zigbee, NFC or other manners, step S320 may further comprise:

S322. Acquire the information associated with authentication of at least one AP device through at least one manner of Bluetooth, Infrared, Zigbee and NFC.

In another possible implementation, the apparatus executing the method of this embodiment can acquire the information associated with authentication of at least one AP device through a broadcast channel regardless of whether the apparatus executing the method of this embodiment has established a connection with the at least one first device or not. In such an implementation, step S320 may further comprise:

S324. Acquire the information associated with authentication of at least one AP device through a broadcast channel.

In such an implementation, for each first device, the information associated with authentication of at least one AP device received by it may comprise identification information of a target first device, and if the identification information of the target first device does not match with the first device, the apparatus executing the method of this embodiment may not use the first device for authentication.

In addition, step S340 may further comprise:

S342. Acquire an authentication message sent to the at least one first device.

The at least one first device will attempt to acquire an authentication message according to the information associated with authentication of at least one AP device. The authentication message is a message for authentication sent thereto according to identification information of the at least one first device, for example, a short message authentication code. The apparatus executing the method of this embodiment may directly acquire the short message authentication code sent to the at least one first device or acquire the short message authentication code by controlling a link of acquiring the short message authentication code on the at least one first device.

S344. Send the authentication message to the at least one AP device.

After the authentication message is acquired, the apparatus executing the method of this embodiment sends the authentication message to the corresponding AP device, to complete authentication.

As described above in combination with the embodiments shown in FIG. 1 and FIG. 2, the second device will access the WLAN through a first device that has accessed the target AP device; therefore, the method of this embodiment further comprises:

S380. Control the first device that has accessed the target AP device to establish a connection with at least one second device respectively.

In one possible implementation, in order to obtain the access of the second device to the target AP device, the connection is established in a manner of controlling one of the first devices that have accessed the target AP device as a wireless hotspot. Alternatively, the connection can be established through at least one manner of Bluetooth, Infrared, Zigbee and NFC.

It should be noted that, the target AP device may be one of the at least one AP device, but the possibility is not ruled out that the target AP device is an AP device other than the at least one AP device. Moreover, in the method of this embodiment, actions where the at least one first device is involved, such as receiving and sending of the at least one first device, may be automatically performed, so as to complete access of the second device to the WLAN without assistance of manual intervention.

Figure 4:
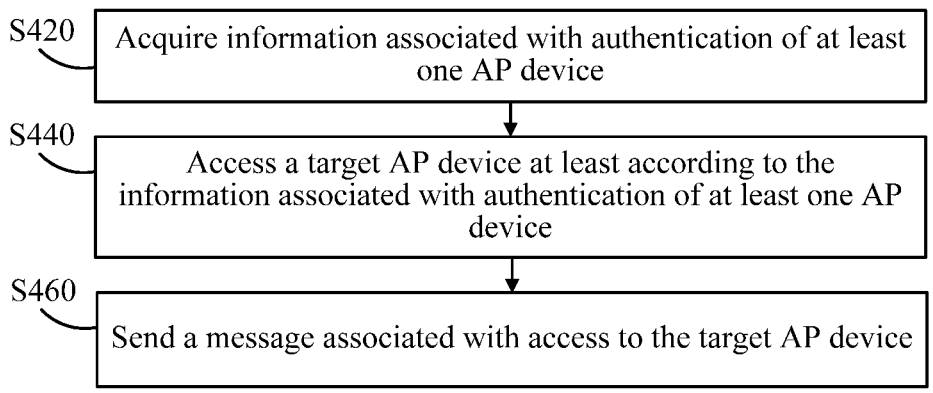
FIG. 4 is a flowchart of an example of an access control method according to a third embodiment of the present application.

FIG. 4 is a flowchart of an example of an access control method according to a third embodiment of the present application. The method may be executed by any first device, configured to assist a second device in accessing a WLAN through the first device. As shown in FIG. 4, the method comprises:

S420. Acquire information associated with authentication of at least one AP device.

As described above in combination with the embodiments shown in FIG. 1 and FIG. 2, when a user uses a second device to access a WLAN, in order to more efficiently access a network, information associated with authentication of at least one AP device is sent to the at least one first device, and such information may be required in step S420 in the method of this embodiment. The information associated with authentication of at least one AP device refers to such information: the at least one first device can provide an authentication message for authentication to the corresponding AP device at least according to the information.

S440. Access a target AP device at least according to the information associated with authentication of at least one AP device.

After the information associated with authentication of at least one AP device is acquired, the first device executing the method of this embodiment can automatically perform corresponding authentication, so as to access a target AP device.

S460. Send a message associated with access to the target AP device.

After the first device executing the method of this embodiment has successfully accessed the target AP device, a message associated with that the at least one first device has accessed the target AP device can be sent in such a manner that at least one second device can receive. The message is configured to inform the at least one second device that the first device has accessed the target AP device. Alternatively, the message is sent to at least one of the at least one second device or a control apparatus of at least one of the at least one second device.

To sum up, the method of this embodiment, by using an authentication manner through cooperation between devices, enables a device currently used by a user to rapidly and efficiently access a target AP device, so as to more efficiently obtain access to a WLAN.

In one possible implementation, if the first device executing the method of this embodiment has established a connection with the at least one second device, for example, the connection is established through Bluetooth, Infrared, Zigbee, NFC or other manners, step S420 may further comprise:

S422. Acquire the information associated with authentication of at least one AP device through at least one manner of Bluetooth, Infrared, Zigbee and NFC.

In another possible implementation, the first device executing the method of this embodiment can acquire the information associated with authentication of at least one AP device through a broadcast channel regardless of whether the first device executing the method of this embodiment has established a connection with the at least one second device or not. In such an implementation, step S420 may further comprise:

S424. Acquire the information associated with authentication of at least one AP device through a broadcast channel.

In such an implementation, for the first device executing the method of this embodiment, the information associated with authentication of at least one AP device received by it may comprise identification information of a target first device, and if the identification information of the target first device does not match with the first device, the first device can stop accessing.

In addition, step S440 may further comprise:

S442. Acquire an authentication message of the at least one AP device.

The first device executing the method of this embodiment will attempt to acquire an authentication message according to the information associated with authentication of at least one AP device. The authentication message is a message for authentication sent thereto according to identification information of the at least one first device, for example, a short message authentication code. The first device executing the method of this embodiment may directly acquire the short message authentication code sent thereto or acquire the short message authentication code through a link of acquiring the short message authentication code.

S444. Send the authentication message to the at least one AP device.

After the authentication message is acquired, the first device executing the method of this embodiment sends the authentication message to the corresponding AP device, to complete authentication.

As described above in combination with the embodiments shown in FIG. 1 and FIG. 2, the second device will access the WLAN through a first device that has accessed the target AP device; therefore, the method of this embodiment further comprises:

S480. Establish a connection respectively with the at least one second device.

In one possible implementation, in order to obtain the access of the second device to the target AP device, the connection can be established in a manner of taking the first device executing the method of this embodiment which has accessed the target AP device as a wireless hotspot. Alternatively, the connection can be established through at least one manner of Bluetooth, Infrared, Zigbee and NFC.

It should be noted that, the target AP device may be one of the at least one AP device, but the possibility is not ruled out that the target AP device is an AP device other than the at least one AP device. Moreover, in the method of this embodiment, actions where the at least one first device is involved, such as receiving and sending of the at least one first device, may be automatically performed, so as to complete access of the second device to the WLAN without assistance of manual intervention.

It should be understood by those skilled in the art that, in any one of the foregoing methods of the specific implementations of the present application, the value of the serial number of each step described above does not mean an execution sequence, and the execution sequence of each step should be determined according to the function and internal logic thereof, and should not be any limitation to the implementation procedure of the specific implementations of the present application.

In addition, an embodiment of the present application further provides a computer readable medium, comprising computer readable instructions that perform the following operation when being executed: executing operations of the steps of the method in the implementation shown in any one of FIG. 1 to FIG. 3.

Figure 5A:
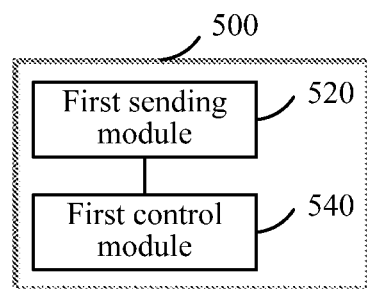
FIG. 5(a)-FIG. 5(g) are structural block diagrams of multiple examples of an access control apparatus according to the first embodiment of the present application.

FIG. 5(a) is a structural block diagram of an example of an access control apparatus according to the first embodiment of the present application. The apparatus 500 may belong to any second device, or be an apparatus independent of any second device and configured to control at least one second device to access a WLAN; in addition to the components described below, the apparatus can further comprise a communication module that achieves communication with any device outside the apparatus according to actual requirements. As shown in FIG. 5(a), the apparatus 500 comprises:

A first sending module 520, configured to send information associated with authentication of at least one AP device.

When the second device searches related information (for example, SSID) of at least one AP device broadcast by the at least one AP device, the second device selects an expected AP device and accepts authentication of the AP device. The authentication manner is a manner that requires participation of at least one first device, for example, authentication is performed in a manner of sending a short message authentication code to the at least one first device. In order to more efficiently access a network, the first sending module 520 sends information associated with authentication of at least one AP device to the at least one first device. For each second device, the information associated with authentication of at least one AP device refers to such information: the at least one first device can provide an authentication message for authentication to the corresponding AP device at least according to the information. For example, in the authentication manner of a short message authentication code, the second device provides identification information of the at least one first device to the at least one AP device, the at least one first device will receive a short message authentication code, and the first sending module 520 can send to the at least one first device an authentication page or authentication link configured to input a short message authentication code and submit the short message authentication code to the corresponding AP device.

A first control module 540, configured to control at least one second device to access a target AP device through at least one first device.

After the first sending module 520 sends the information associated with authentication of at least one AP device to at least one first device, the at least one first device can automatically perform corresponding authentication, so as to enable the first control module 540 to control at least one second device to access a target AP device through the corresponding first device.

To sum up, the apparatus of this embodiment, by using an authentication manner through cooperation between devices, enables a device currently used by a user to rapidly and efficiently access a target AP device with the help of a device assisting in authentication, so as to more efficiently obtain access to a WLAN.

Figure 5B:
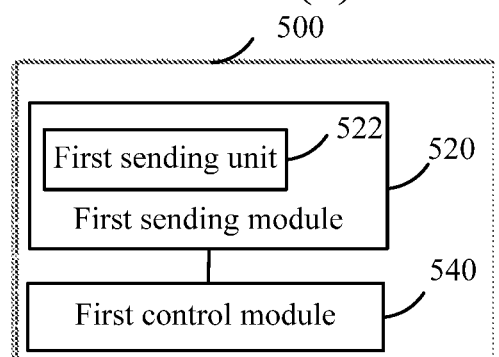

In one possible implementation, if the apparatus 500 of this embodiment has established a connection with the at least one first device, for example, the connection is established through Bluetooth, Infrared, Zigbee, NFC or other manners, as shown in FIG. 5(b), the first sending module 520 may further comprise:

A first sending unit 522, configured to send the information associated with authentication of at least one AP device to the at least one first device.

According to the manner of establishing a connection with the at least one first device, the first sending unit 522 can send the information associated with authentication of at least one AP device through at least one manner of Bluetooth, Infrared, Zigbee and NFC.

Figure 5C:
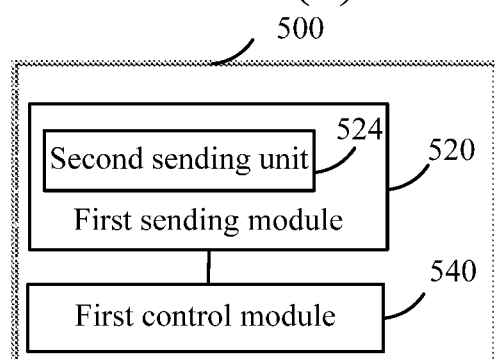

In another possible implementation, the information associated with authentication of at least one AP device can be sent through broadcasting regardless of whether the apparatus 500 of this embodiment has established a connection with the at least one first device or not. In such an implementation, as shown in FIG. 5(c), the first sending module 520 may further comprise:

A second sending unit 524, configured to send the information associated with authentication of at least one AP device through broadcasting.

In such an implementation, the broadcast information associated with authentication of at least one AP device may comprise identification information of a target first device, to enable the first device that receives the broadcast message to assist in authentication according to its own identifier comprised in the information.

Figure 5D:
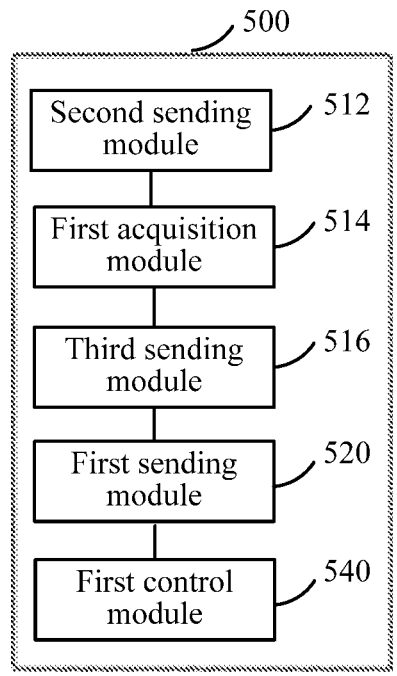

In addition, as shown in FIG. 5(d), the apparatus 500 of this embodiment further comprises:

A second sending module 512, configured to send an access request of the at least one second device to the at least one AP device.

A first acquisition module 514, configured to acquire the information associated with authentication of at least one AP device.

After acquiring the request sent by the second sending module 512, the at least one AP device will send related information to the second device, to prompt the at least one second device to perform authentication. For example, in the authentication manner of a short message authentication code, the AP device may send an authentication page to the second device where identification information of the device that receives a short message authentication code is input. There may be a link with which to input the short message authentication code and to send the short message authentication code to the corresponding AP device on the page. The information associated with authentication of at least one AP device sent to at least one first device by the first sending module 520 may be the information acquired by the first acquisition module 514, or a part thereof.

A third sending module 516, configured to send identification information of the at least one first device to the at least one AP device. It is feasible to send identification information of the at least one first device to the at least one AP device through the information obtained in step S114, to enable the at least one first device to receive an authentication message for passing authentication of the at least one AP device. For example, identification information of the at least one first device is input in a suitable position on the page received by the first acquisition module 514.

Figure 5E:
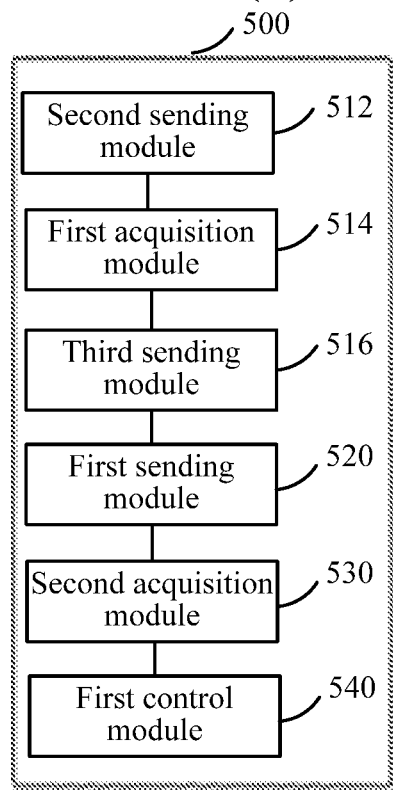

In addition, in the apparatus of this embodiment, the controlling, by the first control module 540, at least one second device to access a target AP device through at least one first device alternatively comprises: after the at least one first device has accessed the target AP device, controlling the at least one second device to indirectly access the target AP device by taking the first device as a wireless hotspot. Correspondingly, as shown in FIG. 5(e), the apparatus 500 of this embodiment may further comprise:

A second acquisition module 530, configured to acquire information associated with that at least one of the at least one first device has accessed the target AP device. The information is configured to inform the apparatus 500 of this embodiment that at least one of the at least one first device has accessed the target AP device. Alternatively, the information is a notification message from at least one of the at least one first device or a control apparatus of at least one of the at least one first device.

Figure 5F:
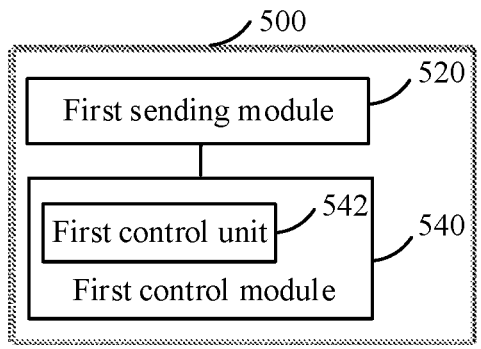

In an implementation where the second device controlled by the apparatus 500 of this embodiment has not established a connection with any first device accessed the target AP device, as shown in FIG. 5(f), the first control module 540 may further comprise:

a first control unit 542, configured to control the at least one second device to respectively establish a connection with one of the first devices that have accessed the target AP device.

In one possible implementation, in order to obtain the access of the second device to the target AP device, for each second device, the first control unit 542 controls that the connection is established in a manner of taking one of the first devices that have accessed the target AP device as a wireless hotspot. Alternatively, the connection can be established through at least one manner of Bluetooth, Infrared, Zigbee and NFC.

Figure 5G:
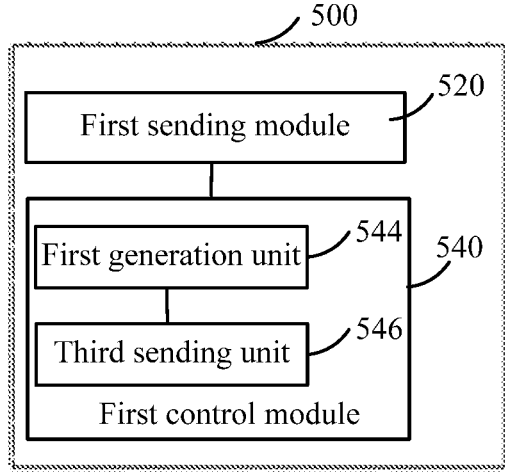

According to different roles that the apparatus of this embodiment plays, as shown in FIG. 5(g), the first control module 540 may further comprise:

A first generation unit 544, configured to generate a control command that controls the at least one second device to access the target AP device through the at least one first device.

A third sending unit 546, configured to send the control command. Alternatively, the third sending unit 546 sends the control command in such a manner that the at least one second device can receive, for example, the control command is directly sent to the at least one second device or sent to a control apparatus of the at least one second device.

It should be noted that, the target AP device may be one of the at least one AP device, but the possibility is not ruled out that the target AP device is an AP device other than the at least one AP device. Moreover, in the apparatus of this embodiment, actions where the at least one first device is involved such as receiving and sending of the at least one first device, may be automatically performed, so as to complete access of the second device to the WLAN without assistance of manual intervention.

In addition, the modules and units that implement the sending function may be the same module; and the modules and units that implement the acquisition function may also be the same module.

Figure 6A:
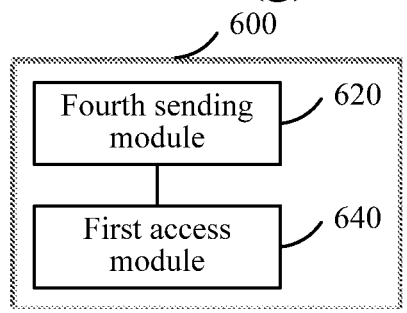
FIG. 6(a)-FIG. 6(f) are structural block diagrams of multiple examples of an access apparatus according to the embodiment of the present application.

FIG. 6(a) is a structural block of an example of an access apparatus according to the first embodiment of the present application. The apparatus 600 may be or belong to any second device; in addition to the components described below, the apparatus can further comprise a communication module that achieves communication with any device outside the apparatus according to actual requirements. As shown in FIG. 6(a), the apparatus 600 comprises:

A fourth sending module 620, configured to send information associated with authentication of at least one AP device.

When the second device searches related information of at least one AP device broadcast by the at least one AP device, the second device selects an expected AP device and accepts authentication of the AP device. The authentication manner is a manner that requires participation of at least one first device, for example, authentication is performed in a manner of sending a short message authentication code to the at least one first device. In order to more efficiently access a network, in the apparatus of this embodiment, the fourth sending module 620 of the second device sends information associated with authentication of at least one AP device to the at least one first device. For each second device, the information associated with authentication of at least one AP device refers to such information: the at least one first device can provide an authentication message for authentication to the corresponding AP device at least according to the information. For example, in the authentication manner of a short message authentication code, the second device provides identification information of the at least one first device to the at least one AP device, the at least one first device will receive a short message authentication code, and the apparatus of this embodiment can send to the at least one first device an authentication page or authentication link configured to input a short message authentication code and submit the short message authentication code to the corresponding AP device.

A first access module 640, configured to access a target AP device through at least one first device.

After the fourth sending module 620 sends the information associated with authentication of at least one AP device to at least one first device, the at least one first device can automatically perform corresponding authentication, so as to enable the first access module 640 to access a target AP device through the corresponding first device.

To sum up, the apparatus of this embodiment, by using an authentication manner through cooperation between devices, enables a device currently used by a user to rapidly and efficiently access a target AP device with the help of a device assisting in authentication, so as to more efficiently obtain access to a WLAN.

Figure 6B:
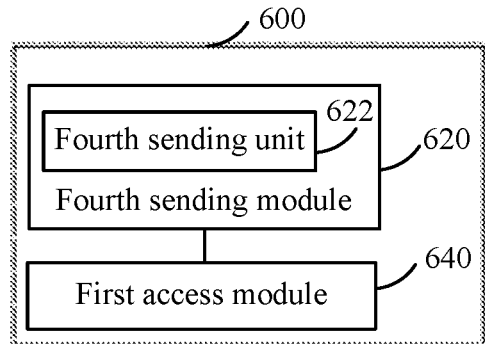

In one possible implementation, if the apparatus of this embodiment has established a connection with the at least one first device, for example, the connection is established through Bluetooth, Infrared, Zigbee, NFC or other manners, as shown in FIG. 6(b), the fourth sending module 620 may further comprise:

A fourth sending unit 622, configured to send the information associated with authentication of at least one AP device to the at least one first device.

According to the manner in which the apparatus of this embodiment establishes a connection with the at least one first device, the first access module 640 can send the information associated with authentication of at least one AP device through at least one manner of Bluetooth, Infrared, Zigbee and NFC.

Figure 6C:
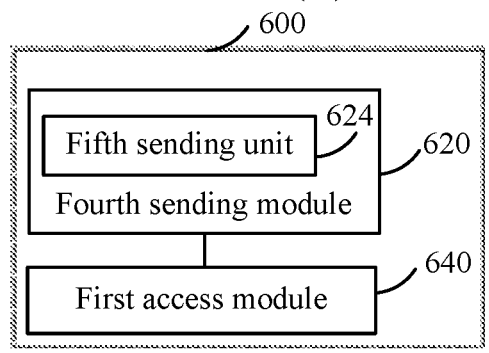

In another possible implementation, the fourth sending module 620 can send the information associated with authentication of at least one AP device through broadcasting regardless of whether the apparatus of this embodiment has established a connection with the at least one first device or not. In such an implementation, as shown in FIG. 6(c), the fourth sending module 620 may further comprise:

A fifth sending unit 624, configured to send the information associated with authentication of at least one AP device through broadcasting.

In such an implementation, the information associated with authentication of at least one AP device broadcast by the fifth sending unit 624 may comprise identification information of a target first device, to enable the first device that receives the broadcast message to assist in authentication according to its own identifier comprised in the information.

Figure 6D:
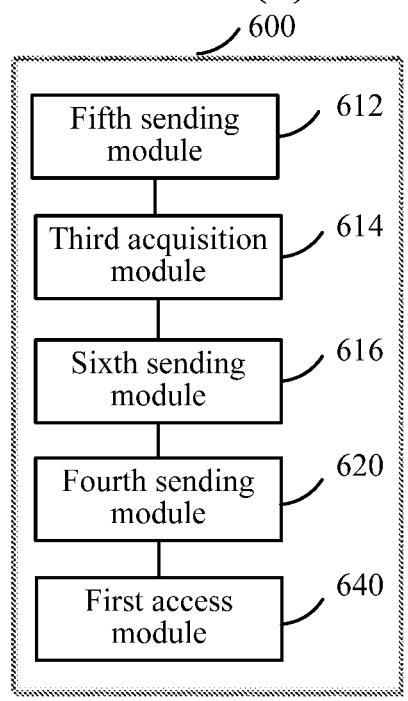

In addition, as shown in FIG. 6(d), the apparatus 600 of this embodiment further comprises:

A fifth sending module 612, configured to send an access request to the at least one AP device.

A third acquisition module 614, configured to acquire the information associated with authentication of at least one AP device.

After receiving the request sent by the fourth sending module 620, the at least one AP device will send related information to the second device, to prompt the at least one second device to perform authentication. For example, in the authentication manner of a short message authentication code, the AP device may send an authentication page to the second device where identification information of the device that receives a short message authentication code is input. There may be a link with which to input the short message authentication code and to send the short message authentication code to the corresponding AP device on the authentication page. The information associated with authentication of at least one AP device sent to at least one first device by the fourth sending module 620 may be the information acquired by the third acquisition module 614, or a part thereof.

A sixth sending module 616, configured to send identification information of the at least one first device to the at least one AP device.

It is feasible to send identification information of the at least one first device to the at least one AP device through the information obtained by the third acquisition module 614, to enable the at least one first device to receive an authentication message for passing authentication of the at least one AP device. For example, identification information of the at least one first device is input in a suitable position on the page received by the third acquisition module 614.

Figure 6E:
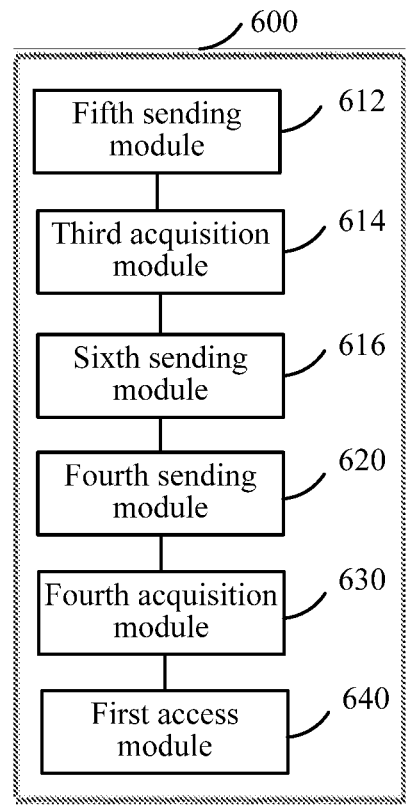

In addition, in the apparatus of this embodiment, the accessing, by the first access module 640, a target AP device through at least one first device alternatively comprises: after the at least one first device has accessed the target AP device, indirectly accessing the target AP device by taking the first device as a wireless hotspot. Correspondingly, as shown in FIG. 6(e), the apparatus 600 of this embodiment may further comprise:

A fourth acquisition module 630, configured to acquire information associated with that at least one of the at least one first device has accessed the target AP device. The information is configured to inform the second device executing the method of this embodiment that at least one of the at least one first device has accessed the target AP device. Alternatively, the information is a notification message from at least one of the at least one first device or a control apparatus of at least one of the at least one first device.

Figure 6F:
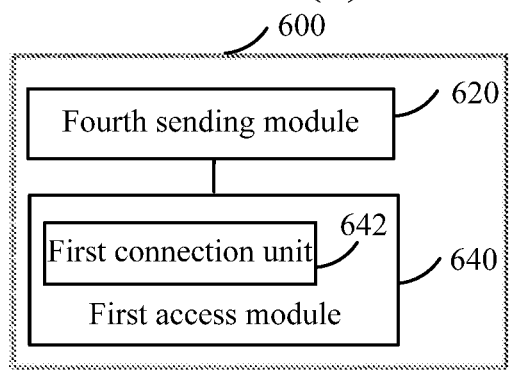

In an implementation where the apparatus of this embodiment has not established a connection with any first device accessed the target AP device, as shown in FIG. 6(f), the first access module 640 may further comprise:

A first connection unit 642, configured to establish a connection with one of the first devices that have accessed the target AP device.

In one possible implementation, in order to obtain the access of the second device to the target AP device, the first connection unit 642 establishes the connection in a manner of taking one of the first devices that have accessed the target AP device as a wireless hotspot. Alternatively, the first connection unit 642 can establish the connection through at least one manner in Bluetooth, Infrared, Zigbee and NFC.

It should be noted that, the target AP device may be one of the at least one AP device, but the possibility is not ruled out that the target AP device is an AP device other than the at least one AP device. Moreover, in the method of this embodiment, actions where the at least one first device is involved, such as receiving and sending of the at least one first device, may be automatically performed, so as to complete access of the second device to the WLAN without assistance of manual intervention.

In addition, the modules and units that implement the sending function may be the same module; and the modules and units that implement the acquisition function may also be the same module.

Figure 7A:
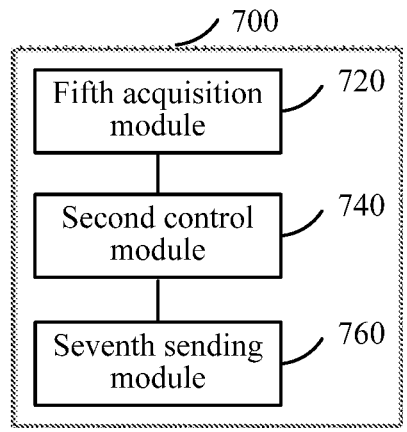
FIG. 7(a)-FIG. 7(e) are structural block diagrams of multiple examples of an access control apparatus according to the second embodiment of the present application.

FIG. 7(a) is a structural block diagram of an example of an access control apparatus according to the second embodiment of the present application. The apparatus 700 may belong to any first device, or is an apparatus independent of any first device and configured to control at least one first device; in addition to the components described below, the apparatus can further comprise a communication module that achieves communication with any device outside the apparatus according to actual requirements. As shown in FIG. 7(a), the apparatus 700 comprises:

A fifth acquisition module 720, configured to acquire information associated with authentication of at least one AP device.

As described above in combination with the embodiments shown in FIG. 1 and FIG. 2, when a user uses a second device to access a WLAN, in order to more efficiently access a network, information associated with authentication of at least one AP device is sent to the at least one first device, and the apparatus of this embodiment acquires such information. The information associated with authentication of at least one AP device refers to such information: the at least one first device can provide an authentication message for authentication to the corresponding AP device at least according to the information.

A second control module 740, configured to control at least one first device to access a target AP device at least according to the information associated with authentication of at least one AP device.

After the fifth acquisition module 720 acquires the information associated with authentication of at least one AP device, the second control module 740 can control the at least one first device to automatically perform corresponding authentication, so as to control the at least one first device to access a target AP device.

A seventh sending module 760, configured to send information associated with that the at least one first device has accessed the target AP device.

After the at least one first device has successfully accessed the target AP device, the seventh sending module 760 can send a message associated with that the at least one first device has accessed the target AP device in such a manner that at least one second device can receive. The message is configured to inform the at least one second device that at least one of the at least one first device has accessed the target AP device. Alternatively, the seventh sending module 760 sends the message to at least one of the at least one second device or a control apparatus of at least one of the at least one second device.

To sum up, the apparatus of this embodiment, by using an authentication manner through cooperation between devices, enables a device currently used by a user to rapidly and efficiently access a target AP device, so as to more efficiently obtain access to a WLAN.

Figure 7B:
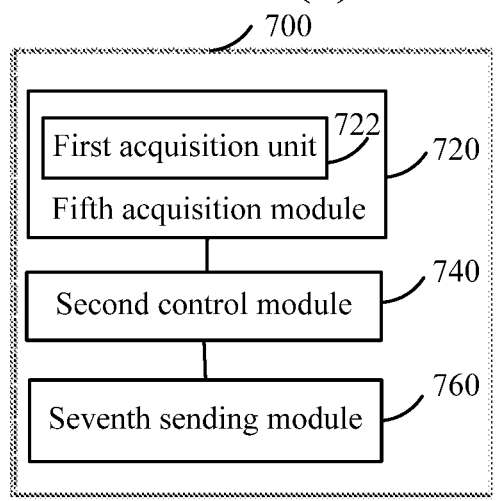

In one possible implementation, if the apparatus of this embodiment has established a connection with the at least one second device, for example, the connection is established through Bluetooth, Infrared, Zigbee, NFC or other manners, as shown in FIG. 7(b), the fifth acquisition module 720 may further comprise:

A first acquisition unit 722, configured to acquire the information associated with authentication of at least one AP device through at least one manner of Bluetooth, Infrared, Zigbee and NFC.

Figure 7C:
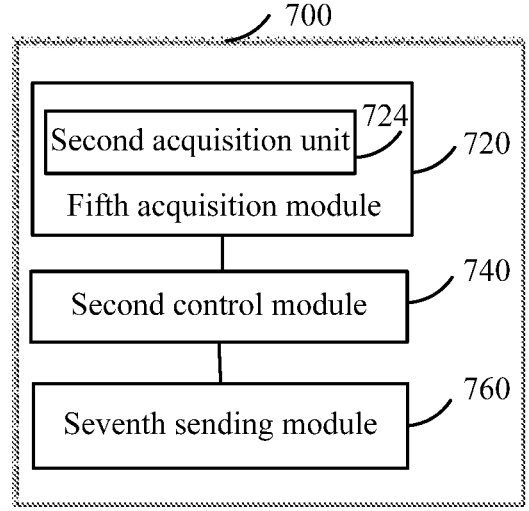

In another possible implementation, the information associated with authentication of at least one AP device can be acquired through a broadcast channel regardless of whether the apparatus of this embodiment has established a connection with the at least one first device or not. In such an implementation, as shown in FIG. 7(c), the fifth acquisition module 720 may further comprise:

A second acquisition unit 724, configured to acquire the information associated with authentication of at least one AP device through a broadcast channel.

In such an implementation, for each first device, the information associated with authentication of at least one AP device received by it may comprise identification information of a target first device, and if the identification information of the target first device does not match with the first device, the apparatus of this embodiment may not use the first device for authentication.

Figure 7D:
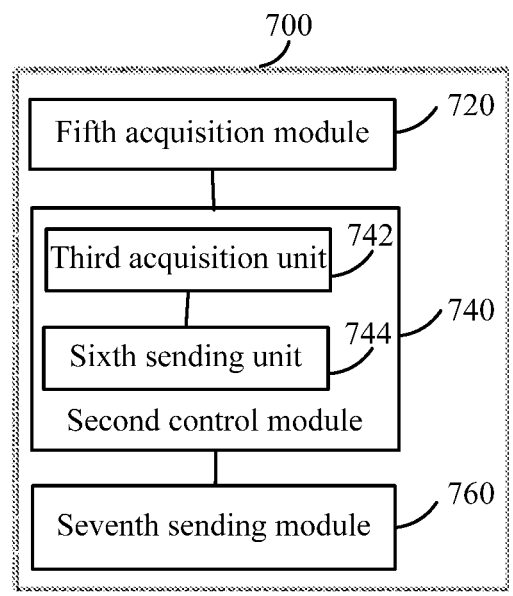

In addition, as shown in FIG. 7(d), the second control module 740 may further comprise:

A third acquisition unit 742, configured to acquire an authentication message sent to the at least one first device.

The at least one first device will attempt to acquire an authentication message according to the information associated with authentication of at least one AP device. The authentication message is a message for authentication sent thereto according to identification information of the at least one first device, for example, a short message authentication code. The third acquisition unit 742 may directly acquire the short message authentication code sent to the at least one first device or acquire the short message authentication code by controlling a link of acquiring the short message authentication code on the at least one first device.

A sixth sending unit 744, configured to send the authentication message to the at least one AP device.

After the authentication message is acquired, the apparatus of this embodiment sends the authentication message to the corresponding AP device through the sixth sending unit 744, to complete authentication.

Figure 7E:
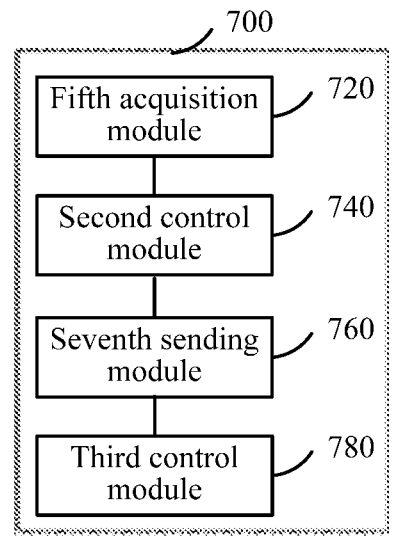
Figure 8A:
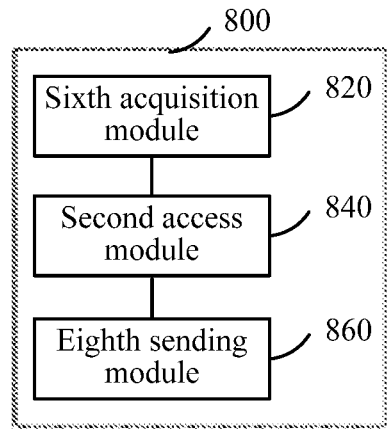
FIG. 8(a)-FIG. 8(e) are structural block diagrams of multiple examples of an access control apparatus according to the third embodiment of the present application.
Figure 8B:
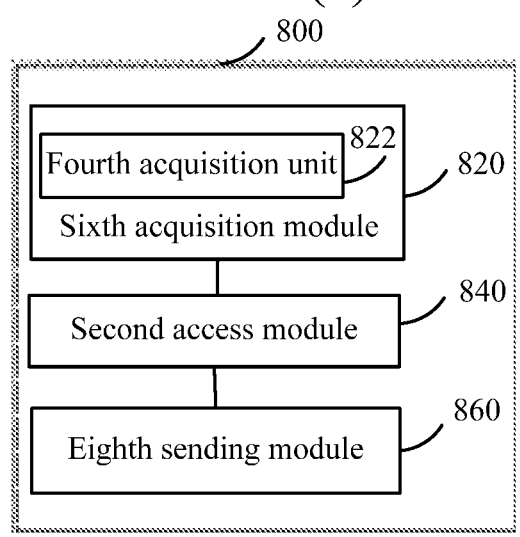
Figure 8C:
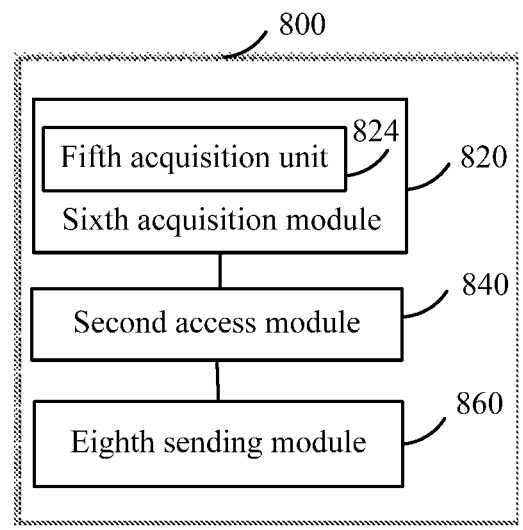
Figure 8D:
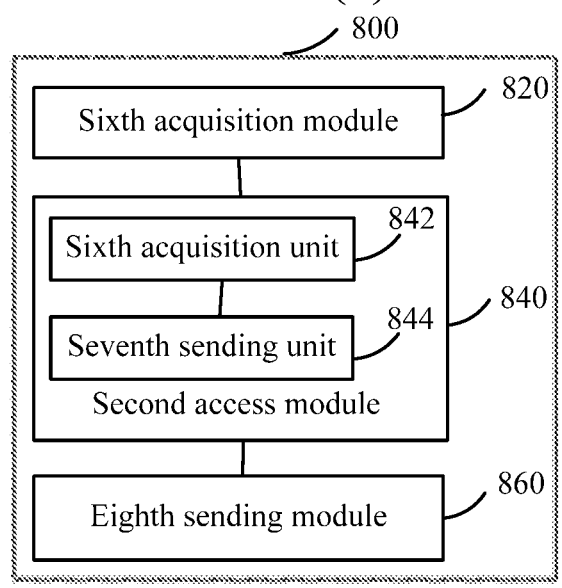
Figure 8E:
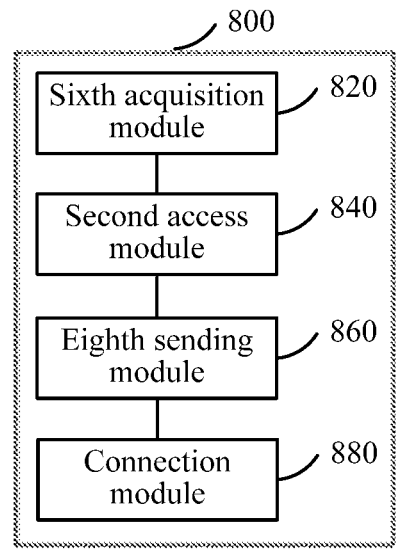

As described above in combination with the embodiments shown in FIG. 1 and FIG. 2, the second device will access the WLAN through a first device that has accessed the target AP device; therefore, as shown in FIG. 7(e), the apparatus of this embodiment further comprises:

a third control module 780, configured to control the first device that has accessed the target AP device to establish a connection with at least one second device respectively.

In one possible implementation, in order to obtain the access of the second device to the target AP device, the third control module 780 controls that the connection is established in a manner of taking the first device that has accessed the target AP device as a wireless hotspot. Alternatively, the third control module 780 can control that the connection is established through at least one manner of Bluetooth, Infrared, Zigbee and NFC.

It should be noted that, the target AP device may be one of the at least one AP device, but the possibility is not ruled out that the target AP device is an AP device other than the at least one AP device. Moreover, in the apparatus of this embodiment, actions where the at least one first device is involved, such as receiving and sending of the at least one first device, may be automatically performed, so as to complete access of the second device to the WLAN without assistance of manual intervention.

In addition, the modules and units that implement the sending function may be the same module; and the modules and units that implement the acquisition function may also be the same module.

FIG. 8(*a*) is a structural block diagram of an example of an access control apparatus according to the third embodiment of the present application. The apparatus 800 may be or belong to any first device, configured to assist a second device in accessing a WLAN through the first device; in addition to the components described below, the apparatus can further comprise a communication module that achieves communication with any device outside the apparatus according to actual requirements. As shown in FIG. 8(*a*), the apparatus 800 comprises:

A sixth acquisition module 820, configured to acquire information associated with authentication of at least one AP device.

As described above in combination with the embodiments shown in FIG. 1 and FIG. 2, when a user uses a second device to access a WLAN, in order to more efficiently access a network, information associated with authentication of at least one AP device is sent to the at least one first device, and the sixth acquisition module 820 is configured to acquire such information. The information associated with authentication of at least one AP device refers to such information: the at least one first device can provide an authentication message for authentication to the corresponding AP device at least according to the information.

A second access module 840, configured to access a target AP device at least according to the information associated with authentication of at least one AP device.

After the sixth acquisition module 820 acquires the information associated with authentication of at least one AP device, the second access module 840 can automatically perform corresponding authentication, so as to access a target AP device.

An eighth sending module 860, configured to send information associated with access to the target AP device.

After the apparatus of this embodiment has successfully accessed the target AP device through the second access module 840, the eighth sending module 860 can send a message associated with that the at least one first device has accessed the target AP device in such a manner that at least one second device can receive. The message is configured to inform the at least one second device that the first device has accessed the target AP device. Alternatively, the eighth sending module 860 sends the message to at least one of the at least one second device or a control apparatus of at least one of the at least one second device.

To sum up, the apparatus of this embodiment, by using an authentication manner through cooperation between devices, enables a device currently used by a user to rapidly and efficiently access a target AP device, so as to more efficiently obtain access to a WLAN.

In one possible implementation, if the apparatus of this embodiment has established a connection with the at least one second device, for example, the connection is established through Bluetooth, Infrared, Zigbee, NFC or other manners, as shown in FIG. 8(*b*), the sixth acquisition module 820 may further comprise:

A fourth acquisition unit 822, configured to acquire the information associated with authentication of at least one AP device through at least one manner of Bluetooth, Infrared, Zigbee and NFC.

In another possible implementation, the information associated with authentication of at least one AP device can be acquired through a broadcast channel regardless of whether the apparatus of this embodiment has established a connection with the at least one second device or not. In such an implementation, as shown in FIG. 8(*c*), the sixth acquisition module 820 may further comprise:

A fifth acquisition unit 824, configured to acquire the information associated with authentication of at least one AP device through a broadcast channel.

In such an implementation, for the apparatus of this embodiment, the information associated with authentication of at least one AP device received by it may comprise identification information of a target first device, and if the identification information of the target first device does not match with the first device, the first device can perform authentication and stop accessing.

In addition, as shown in FIG. 8(*d*), the second access module 840 may further comprise:

A sixth acquisition unit 842, configured to acquire an authentication message of the at least one AP device.

The apparatus of this embodiment will attempt to acquire an authentication message according to the information associated with authentication of at least one AP device. The authentication message is a message for authentication sent thereto according to identification information of the at least one first device, for example, a short message authentication code. The second acquisition unit 842 may directly acquire the short message authentication code sent thereto or acquire the short message authentication code through a link of acquiring the short message authentication code.

A seventh sending unit 844, configured to send the authentication message to the at least one AP device.

After the authentication message is acquired, the seventh sending unit 844 sends the authentication message to the corresponding AP device, to complete authentication.

As described above in combination with the embodiments shown in FIG. 1 and FIG. 2, the second device will access the WLAN through a first device that has accessed the target AP device; therefore, as shown in FIG. 8(*e*), the apparatus 800 of this embodiment further comprises:

A connection module 880, configured to establish a connection respectively with the at least one second device.

In one possible implementation, in order to obtain the access of the second device to the target AP device, the connection module 880 can establish the connection in a manner of taking the apparatus of this embodiment that has accessed the target AP device as a wireless hotspot. Alternatively, the connection module 880 can establish the connection through at least one manner of Bluetooth, Infrared, Zigbee and NFC.

It should be noted that, the target AP device may be one of the at least one AP device, but the possibility is not ruled out that the target AP device is an AP device other than the at least one AP device. Moreover, in the apparatus of this embodiment, actions where the at least one first device is involved, such as receiving and sending of the at least one first device, may be automatically performed, so as to complete access of the second device to the WLAN without assistance of manual intervention.

In addition, the modules and units that implement the sending function may be the same module; and the modules and units that implement the acquisition function may also be the same module.

The methods and apparatus of the embodiments of the present application are further described below with specific examples.

A user carrying a tablet PC A and a smartphone B come to a certain café, and the two devices have established a connection through Bluetooth. The tablet PC A is the second device in the embodiments of the present application, and the smartphone B is the first device in the embodiments of the present application. The tablet PC A scans a free Wi-Fi access point, and an authentication page is popped up after user click. The user inputs a mobile phone number of the smartphone B on the tablet PC A and presses the button "acquire an authentication short message", and the tablet PC A sends ID of the access point and an authentication link corresponding to the button "OK/Authentication" to the smartphone B through Bluetooth. After the smartphone B receives the authentication short message, the link is modified with the authentication password in the short message, and the link is accessed so as to perform authentication through the access point. The tablet PC A can then be connected to the smartphone B via a Bluetooth network, to connect to the Internet by taking the smartphone B as a wireless hotspot.

Figure 9:
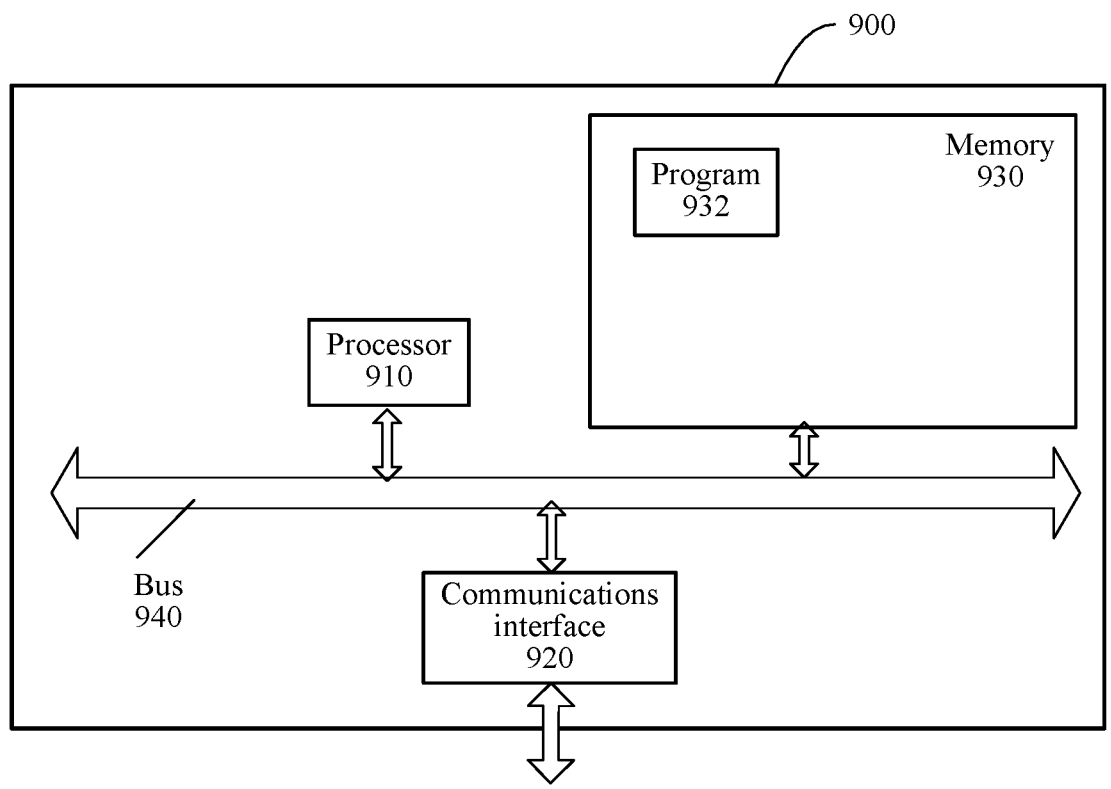
FIG. 9 is a structural block diagram of another example of the access control apparatus according to the first embodiment of the present application.

FIG. 9 is another schematic structural diagram of an access control apparatus 900 according to the first embodiment of the present application; the specific embodiment of the present application does not limit specific implementations of the access control apparatus 900. As shown in FIG. 9, the access control apparatus 900 may comprise:

a processor 910, a Communications Interface 920, a memory 930, and a communications bus 940.

The processor 910, the Communications Interface 920, and the memory 930 accomplish mutual communications via the communications bus 940.

The Communications Interface 920 is configured to communicate with a network element such as a client.

The processor 910 is configured to execute a program 932, and specifically, can implement relevant functions of the access control apparatus in the apparatus embodiment of FIG. 5(*a*).

Specifically, the program 932 may comprise program codes, the program code comprising computer operation instructions.

The processor 910 may be a central processing unit (CPU), or an application specific integrated circuit (ASIC), or be configured to be one or more integrated circuits which implement the embodiments of the present application. The program 932 may be specifically configured to enable the access control apparatus 900 to execute the following steps:

sending information associated with authentication of at least one AP device; and controlling at least one second device to access a target AP device through at least one first device;

wherein the at least one first device is a device that receives the information associated with authentication of at least one AP device.

Reference can be made to corresponding description in the corresponding steps and units in the embodiments of the image processing method for specific implementation of the steps in the program 932, which is not repeated herein. Those skilled in the art can clearly understand that, reference can be made to the corresponding process description in the method embodiments for the devices described above and the specific working procedures of the modules, and will not be repeated herein in order to make the description clear and concise.

Figure 10:
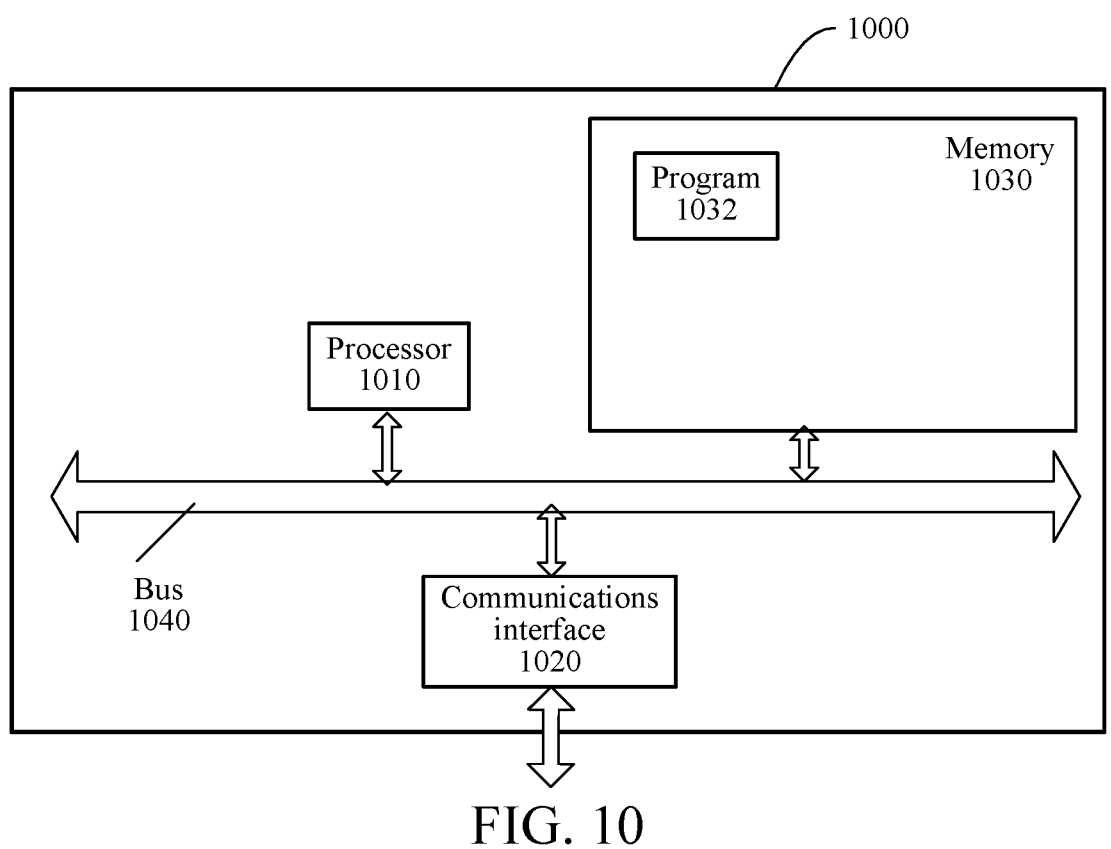
FIG. 10 is a structural block of another example of the access apparatus according to the embodiment of the present application.

FIG. 10 is another schematic structural diagram of an access apparatus 1000 according to the embodiment of the present application; the specific embodiment of the present application does not limit specific implementations of the access apparatus 1000. As shown in FIG. 10, the access apparatus 1000 may comprise:

a processor 1010, a Communications Interface 1020, a memory 1030, and a communications bus 1040.

The processor 1010, the Communications Interface 1020, and the memory 1030 accomplish mutual communications via the communications bus 1040.

The Communications Interface 1020 is configured to communicate with a network element such as a client.

The processor 1010 is configured to execute a program 1032, and specifically, can implement relevant functions of the access apparatus in the apparatus embodiment of FIG. 6(*a*).

Specifically, the program 1032 may comprise program codes, the program code comprising computer operation instructions.

The processor 1010 may be a central processing unit (CPU), or an application specific integrated circuit (ASIC), or be configured to be one or more integrated circuits which implement the embodiments of the present application. The program 1032 may be specifically configured to enable the access apparatus 1000 to execute the following steps:

sending information associated with authentication of at least one AP device; and accessing a target AP device through at least one first device;

wherein the at least one first device is a device that receives the information associated with authentication of at least one AP device.

Reference can be made to corresponding description in the corresponding steps and units in the embodiments of the image processing method for specific implementation of the steps in the program 1032, which is not repeated herein. Those skilled in the art can clearly understand that, reference can be made to the corresponding process description in the method embodiments for the devices described above and the specific working procedures of the modules, and will not be repeated herein in order to make the description clear and concise.

Figure 11:
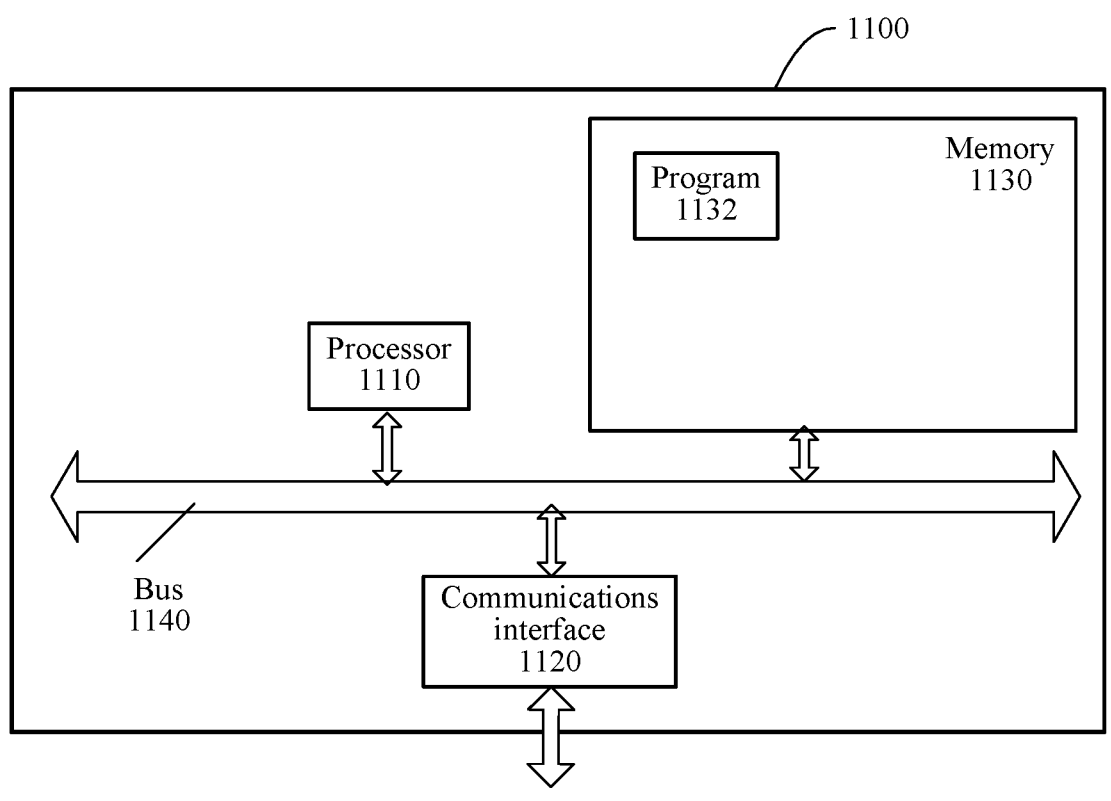
FIG. 11 is a structural block of another example of the access control apparatus according to the second embodiment of the present application.

FIG. 11 is another schematic structural diagram of an access control apparatus 1100 according to the second embodiment of the present application; the specific embodiment of the present application does not limit specific implementations of the access control apparatus 1100. As shown in FIG. 11, the access control apparatus 1100 may comprise:

a processor 1110, a Communications Interface 1120, a memory 1130, and a communications bus 1140.

The processor 1110, the Communications Interface 1120, and the memory 1130 accomplish mutual communications via the communications bus 1140.

The Communications Interface 1120 is configured to communicate with a network element such as a client.

The processor 1110 is configured to execute a program 1132, and specifically, can implement relevant functions of the access control apparatus in the apparatus embodiment of FIG. 7(*a*).

Specifically, the program 1132 may comprise program codes, the program code comprising computer operation instructions.

The processor 1110 may be a central processing unit (CPU), or an application specific integrated circuit (ASIC), or be configured to be one or more integrated circuits which implement the embodiments of the present application. The program 1132 may be specifically configured to enable the access control apparatus 1100 to execute the following steps:

acquiring information associated with authentication of at least one AP device;

controlling at least one first device to access a target AP device at least according to the information associated with authentication of at least one AP device; and sending information associated with that the at least one first device has accessed the target AP device.

Reference can be made to corresponding description in the corresponding steps and units in the embodiments of the image processing method for specific implementation of the steps in the program 1132, which is not repeated herein. Those skilled in the art can clearly understand that, reference can be made to the corresponding process description in the method embodiments for the devices described above and the specific working procedures of the modules, and will not be repeated herein in order to make the description clear and concise.

Figure 12:
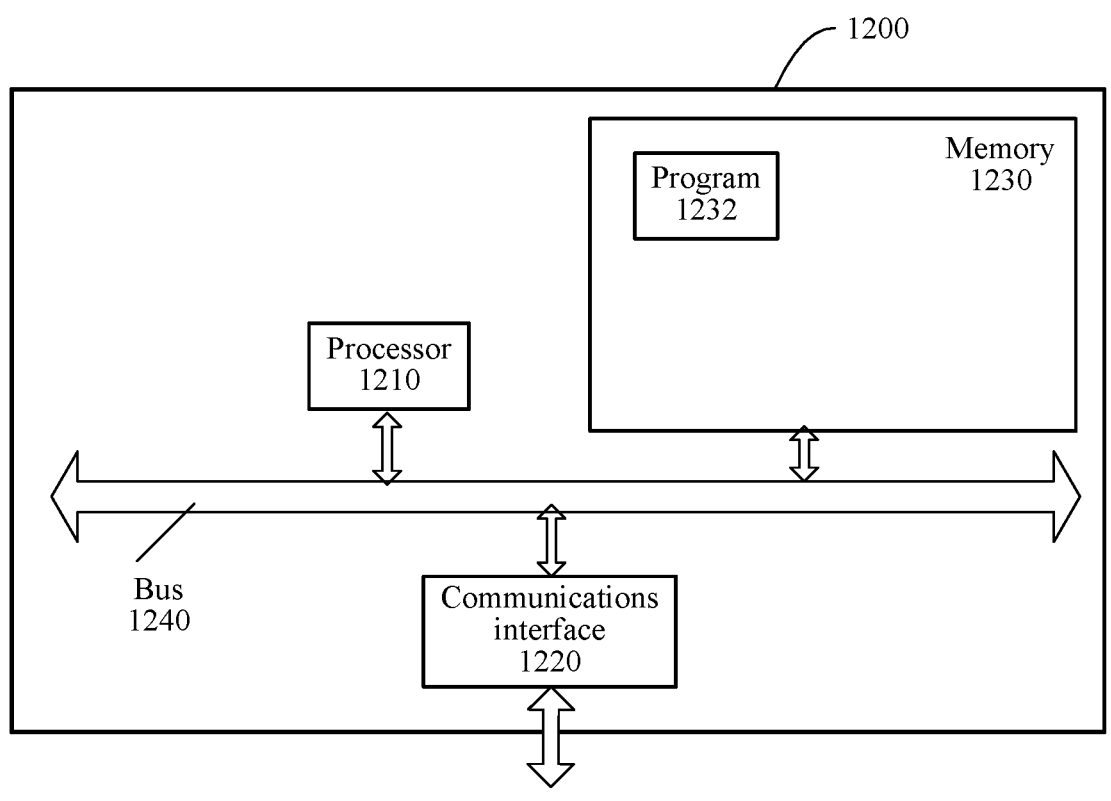
FIG. 12 is a structural block of another example of the access control apparatus according to the third embodiment of the present application.

FIG. 12 is another schematic structural diagram of an access control apparatus 1200 according to the third embodiment of the present application; the specific embodiment of the present application does not limit specific implementations of the access control apparatus 1200. As shown in FIG. 12, the access control apparatus 1200 may comprise:

a processor 1210, a Communications Interface 1220, a memory 1230, and a communications bus 1240.

The processor 1210, the Communications Interface 1220, and the memory 1230 accomplish mutual communications via the communications bus 1240.

The Communications Interface 1220 is configured to communicate with a network element such as a client.

The processor 1210 is configured to execute a program 1232, and specifically, can implement relevant functions of the access control apparatus in the apparatus embodiment of FIG. 8(*a*).

Specifically, the program 1232 may comprise program codes, the program code comprising computer operation instructions.

The processor 1210 may be a central processing unit (CPU), or an application specific integrated circuit (ASIC), or be configured to be one or more integrated circuits which implement the embodiments of the present application. The program 1232 may be specifically configured to enable the access control apparatus 1200 to execute the following steps:

acquiring information associated with authentication of at least one AP device;

accessing a target AP device at least according to the information associated with authentication of at least one AP device; and sending information associated with access to the target AP device.

Reference can be made to corresponding description in the corresponding steps and units in the embodiments of the image processing method for specific implementation of the steps in the program 1232, which is not repeated herein. Those skilled in the art can clearly understand that, reference can be made to the corresponding process description in the method embodiments for the devices described above and the specific working procedures of the modules, and will not be repeated herein in order to make the description clear and concise.

Those skilled in the art can clearly understand that, reference can be made to the corresponding process description in the apparatus embodiments for the devices described above and the specific working procedures of the modules, and will not be repeated herein in order to make the description clear and concise.

Although the subject matter is described herein in the general context of program modules that execute in conjunction with an application program that runs on an operating system on a computer system, those skilled in the art will recognize that the subject matter may also be implemented in combination with other types of program modules. Generally, program modules comprise routines, programs, components, data structures and other types of structures that perform particular tasks or implement particular abstract data types. It can be understood by those skilled in the art that the subject matter described herein may be practiced with other computer system configurations, comprising handheld devices, multiprocessor systems, microprocessor-based or programmable consumer electronics, minicomputers, mainframe computers, and so on, and may also be practiced in distributed computing environments where tasks are performed by remote processing devices linked through a communications network. In a distributed computing environment, program modules may be located in both local and remote memory storage devices.

It can be appreciated by those of ordinary skill in the art that each exemplary unit and method step described with reference to the embodiments disclosed herein can be implemented by electronic hardware or a combination of computer software and electronic hardware. Whether these functions are executed in a hardware mode or a software mode depends on particular applications and design constraint conditions of the technical solution. The professional technicians can use different methods to implement the functions described with respect to each particular application, but such implementation should not be considered to go beyond the scope of the present application.

If the functions are implemented in the form of a software functional unit and is sold or used as an independent product, it can be stored in a non-transitory computer-readable storage medium. Based on such understanding, the technical solution of the present application essentially or the part which contributes to the prior art or a part of the technical solution can be embodied in the form of a software product, and the computer software product is stored in a storage medium, and comprises several instructions for enabling a computer device (which can be a personal computer, a server, or a network device, and the like) to execute all or some steps of the method described in each embodiment of the present application. The foregoing storage medium comprises, a USB disk, a removable hard disk, a read-only memory (ROM), a random access memory (RAM), an erasable programmable read-only memory (EPROM), an electrically erasable programmable read-only memory (EEPROM), a flash memory or other solid-state memory technology, a CD-ROM, a digital versatile disc (DVD), an HD-DVD, a Blue-ray disc or other optical storage devices, a magnetic tape, magnetic disk storage or other magnetic storage devices, or any other medium that can be used for storing required information and can be accessed by a computer.

The above implementations are only intended to describe the present application rather than to limit the present application; various changes and variations may be made by those of ordinary skill in the art without departing from the spirit and scope of the present application, so all equivalent technical solutions also belong to the scope of the present application, and the scope of patent protection of the present application should be defined by the claims.

What is claimed is:

1. An access method, executed by a device requesting access to a target access point device, wherein the method comprises:
   sending information associated with authentication of at least one access point device to at least one first device, the information associated with authentication of at least one access point device being prompt information sent by the target access point device to the at least one first device to prompt the at least one first device to perform authentication; and
   accessing the target access point device through the at least one first device;
   wherein the at least one first device is a device that receives the information associated with authentication of at least one access point device.

2. The method of claim 1, wherein the sending information associated with authentication of at least one access point device comprises:
   sending the information associated with authentication of at least one access point device through broadcasting.

3. The method of claim 1, further comprising:
   sending an access request to the at least one access point device;
   acquiring the information associated with authentication of at least one access point device; and
   sending identification information of the at least one first device to the at least one access point device.

4. The method of claim 2, further comprising:
   acquiring information associated with that at least one of the at least one first device has accessed the target access point device;
   wherein the accessing a target access point device through at least one first device comprises:
   establishing a connection with one of the at least one first device that has accessed the target access point device.

5. An access control method, comprising:
   acquiring, from a device requesting access to a target access point device, information associated with authentication of at least one access point device, the information associated with authentication of at least one access point device being prompt information sent by the target access point device to at least one first device to prompt the at least one first device to perform authentication;
   accessing the target access point device at least according to the information associated with authentication of at least one access point device; and
   sending information associated with access to the target access point device.

6. The method of claim 5, wherein the acquiring information associated with authentication of at least one access point device comprises:
   acquiring the information associated with authentication of at least one access point device through a broadcast channel.

7. The method of claim 5, wherein the accessing a target access point device comprises:
   acquiring an authentication message of the at least one access point device; and
   sending the authentication message to the at least one access point device.

8. The method of claim 5, further comprising:
   establishing a connection respectively with at least one second device.

9. An access apparatus, applicable to a device requesting access to a target access point device, wherein the apparatus comprises:
   a fourth sending module, configured to send information associated with authentication of at least one access point device to at least one first device, the information associated with authentication of at least one access point device being prompt information sent by the target access point device to the at least one first device to prompt the at least one first device to perform authentication; and
   a first access module, configured to access the target access point device through the at least one first device;
   wherein the at least one first device is a device that receives the information associated with authentication of at least one access point device.

10. The apparatus of claim 9, wherein the fourth sending module comprises:
    a fifth sending unit, configured to send the information associated with authentication of at least one access point device through broadcasting.

11. The apparatus of claim 9, further comprising:
    a fifth sending module, configured to send an access request to the at least one access point device;
    a third acquisition module, configured to acquire the information associated with authentication of at least one access point device; and
    a sixth sending module, configured to send identification information of the at least one first device to the at least one access point device.

12. The apparatus of claim 9, further comprising:
    a fourth acquisition module, configured to acquire information associated with that at least one of the at least one first device has accessed the target access point device;
    wherein the first access module comprises:
    a first connection unit, configured to establish a connection with one of the at least one first device that has accessed the target access point device.

13. An access control apparatus, from a device requesting access to a target access point device, wherein the apparatus comprises:
    a sixth acquisition module, configured to acquire information associated with authentication of at least one access point device, the information associated with authentication of at least one access point device being prompt information sent by the target access point device to at least one first device to prompt the at least one first device to perform authentication;

a second access module, configured to access the target access point device at least according to the information associated with authentication of at least one access point device; and an eighth sending module, configured to send information associated with access to the target access point device.

14. The apparatus of claim 13, wherein the sixth acquisition module comprises:
a fifth acquisition unit, configured to acquire the information associated with authentication of at least one access point device through a broadcast channel.

15. The apparatus of claim 13, wherein the second access module comprises:
a sixth acquisition unit, configured to acquire an authentication message of the at least one access point device; and
a seventh sending unit, configured to send the authentication message to the at least one access point device.

16. The apparatus of claim 13, further comprising:
a connection module, configured to establish a connection respectively with at least one second device.

17. A non-transitory computer readable storage device, comprising at least one executable instruction, which, in response to execution, causes a system comprising a processor to perform operations, comprising:
sending, by a device requesting access to a target access point device, information associated with authentication of at least one access point device, the information associated with authentication of at least one access point device being prompt information sent by the target access point device to at least one first device to prompt the at least one first device to perform authentication; and
accessing the target access point device through the at least one first device;
wherein the at least one first device is a device that receives the information associated with authentication of at least one access point device.

18. A device for access comprising a processor and memory, wherein the memory storing computer executable instructions that, when executed, causes the processor to perform operations, comprising:
sending, by a device requesting access to a target access point device, information associated with authentication of at least one access point device, the information associated with authentication of at least one access point device being prompt information sent by the target access point device to at least one first device to prompt the at least one first device to perform authentication; and
accessing the target access point device through the at least one first device;
wherein the at least one first device is a device that receives the information associated with authentication of at least one access point device.

19. A non-transitory computer readable storage device, comprising at least one executable instruction, which, in response to execution, causes a system comprising a processor to perform operations, comprising:
acquiring, from a device requesting access to a target access point device, information associated with authentication of at least one access point device, the information associated with authentication of at least one access point device being prompt information sent by the target access point device to at least one first device to prompt the at least one first device to perform authentication;
accessing the target access point device at least according to the information associated with authentication of at least one access point device; and
sending information associated with access to the target access point device.

20. A device for access control comprising a processor and memory, wherein the memory storing computer executable instructions that, when executed, causes the processor to perform operations, comprising:
acquiring, from a device requesting access to a target access point device, information associated with authentication of at least one access point device, the information associated with authentication of at least one access point device being prompt information sent by the target access point device to at least one first device to prompt the at least one first device to perform authentication;
accessing the target access point device at least according to the information associated with authentication of at least one access point device; and
sending information associated with access to the target access point device.

* * * * *